US012674648B2

(12) United States Patent
Von Mueller et al.

(10) Patent No.: US 12,674,648 B2
(45) Date of Patent: Jul. 7, 2026

(54) ZIGZAG-SHAPED PROTECTION ELEMENT AND METHOD FOR ITS PRODUCTION

(71) Applicant: BENTELER AUTOMOBILTECHNIK GMBH, Paderborn (DE)

(72) Inventors: Werner Von Mueller, Bruchsal (DE); Udo Klasfauseweh, Guetersloh (DE); Andreas Ruwe, Bad Essen (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 29 days.

(21) Appl. No.: 18/977,948

(22) Filed: Dec. 12, 2024

(65) Prior Publication Data

US 2025/0198728 A1 Jun. 19, 2025

(30) Foreign Application Priority Data

Dec. 15, 2023 (EP) .................................... 23217246

(51) Int. Cl.
F41H 5/02 (2006.01)
B21D 53/00 (2006.01)
B23K 11/087 (2006.01)
B23K 26/38 (2014.01)

(52) U.S. Cl.
CPC .............. F41H 5/02 (2013.01); B21D 53/00 (2013.01); B23K 11/087 (2013.01); B23K 26/38 (2013.01)

(58) Field of Classification Search
CPC ......... F41H 5/02; B21D 53/00; B23K 11/087; B23K 26/38

USPC .......................................................... 89/36.02
See application file for complete search history.

(56) References Cited

U.S. PATENT DOCUMENTS

| | | | | |
|---|---|---|---|---|
| 1,896,656 | A | * | 2/1933 | Anderson .............. B21D 53/00 |
| | | | | 55/440 |
| 8,746,122 | B1 | * | 6/2014 | Roland ................... F41H 5/023 |
| | | | | 89/36.02 |
| 9,459,079 | B1 | * | 10/2016 | Dudt ..................... F41H 5/0442 |
| 11,243,051 | B2 | * | 2/2022 | Roux ........................ F41H 5/04 |

(Continued)

FOREIGN PATENT DOCUMENTS

| | | |
|---|---|---|
| DE | 102010016605 A1 | 10/2011 |
| DE | 102017102547 A1 | 8/2018 |
| DE | 102020111534 A1 | 10/2021 |

(Continued)

OTHER PUBLICATIONS

Extended European Search Report, Application No. EP23217246.0, mailed May 23, 2024, 20pp.

*Primary Examiner* — Samir Abdosh
(74) *Attorney, Agent, or Firm* — HAUPTMAN HAM, LLP

(57) ABSTRACT

A method for the production of a zigzag-shaped protection element formed from multiple individual profiles includes the following steps: providing the individual profiles, welding the individual profiles to form a zigzag-shaped preform of the protection element such as to form at least one weld seam, wherein the individual profiles are welded to each another at an angle of 30° to 120°, inserting the preform into a hot molding tool, molding the preform into the zigzag-shaped protection element in the hot molding tool, and mold hardening of the zigzag-shaped protection element in the hot molding tool.

21 Claims, 4 Drawing Sheets

(56)            References Cited

U.S. PATENT DOCUMENTS

2008/0006146 A1 *   1/2008   Magnusson ........... F41H 5/0492
                                                       89/36.02
2011/0168000 A1 *   7/2011   Langner ................... F41H 5/24
                                                       89/917

FOREIGN PATENT DOCUMENTS

EP          2156134 B1    5/2012
GB          2390888 A     1/2004
GB          2483267 A     3/2012
WO      WO-2013164100 A1 *  11/2013   ........... E04C 2/3405

* cited by examiner

ZIGZAG-SHAPED PROTECTION ELEMENT AND METHOD FOR ITS PRODUCTION

RELATED APPLICATIONS

The present application claims priority of European Application Number 23217246.0 filed Dec. 15, 2023, the disclosure of which is hereby incorporated by reference herein in its entirety.

FIELD

The present disclosure relates to a method for the production of a zigzag-shaped protection element formed from multiple individual profiles. Furthermore, the present disclosure relates to a zigzag-shaped protection element.

BACKGROUND

Zigzag-shaped protection elements or armor elements provide ballistic protection to persons, vehicles or other systems. The production of corresponding protection elements is carried out by molding flat plates or sheets. The blanks are bent to create a zigzag-shaped protection element. The zigzag design refers to a cross-section of the protection element and ensures that the projectiles hitting the protection element are deflected. The projectile begins to rotate and its penetrating power is reduced.

A zigzag-shaped protection element is described, for example, from U.S. Pat. No. 8,746,122 B1.

However, when zigzag-shaped protection elements are manufactured in this way, bending radii arise due to the molding process, which is able to have a negative effect on the protective effect of the protection element. Bending reduces the material thickness at the bending points of the workpiece and thus the resistance of the protection element to projectiles. Even with large bending radii, i.e., with little bending, the strength of the workpiece decreases, which is also able to have a negative effect on the protective function of the protection element.

SUMMARY

The object of the present disclosure is to provide a method for producing a zigzag-shaped protection element, wherein the protection element maintains the protective effect over its entire extension without experiencing weakening in certain regions during production and thus losses in terms of protective capacity. Furthermore, an object of the present disclosure is also to provide such a zigzag-shaped protection element.

The object related to the method is solved by a method for producing a zigzag-shaped protection element. The part of the problem related to the element is solved by a zigzag-shaped protection element.

The method according to the present disclosure for producing a zigzag-shaped protection element formed from multiple individual profiles, which is a protective wall, includes the following steps:

a) providing the individual profiles, b) welding the individual profiles to form a zigzag-shaped preform of the protection element to form at least one weld seam, wherein the individual profiles are welded to each another at an angle of 30° to 120°, c) inserting the preform into a hot molding tool, d) molding the preform into the zigzag-shaped protection element in the hot molding tool, e) mold hardening of the zigzag-shaped protection element in the hot molding tool.

The method according to the present disclosure for producing the zigzag-shaped protection element thus has the advantage that no bending has to take place in the molding step. The individual profiles are already aligned at the desired angle to each other and are welded together at respective longitudinal edges so that the protection element has a zigzag cross-section. This means that no bending radii are created during molding, which would weaken the protection element being produced and thus its protective effect. The protection element provides the necessary protective effect over its entire extension.

The fact that the individual profiles are welded to each other at an angle of 30° to 120° has proven to be advantageous for deflecting projectiles and thus for reducing projectile penetration power. Individual profiles need not be used to form the zigzag-shaped protection element and welded together always have an identical angle. The zigzag shape also increases the stability of the protection element. This is advantageous when the protection element is used as a protective wall.

By molding the preform into the zigzag-shaped protection element in the hot molding tool, the preform is calibrated again. A final molding or final calibration for final forming is also able to be used instead of a preform. The angles formed between the individual profiles are able to be precisely adjusted by the molding step.

The mold hardening that follows the molding process, which is press hardening, reduces the size of heat-affected zones adjacent to the weld seams created by welding. This results in significantly improved bullet resistance right up to the weld seams.

In at least one embodiment of the present disclosure, individual profiles made of metal or a metal alloy are used, for example, steel. In step d) of the method, the preform is heated to a temperature which is higher than the austenitization temperature of the metal or metal alloy with the highest austenitization temperature. This leads to a structural change within the metal or metal alloy. In at least one embodiment of the present disclosure, a face-centered cubic modification of the crystal structure occurs.

The mold hardening according to step e) takes place by quenching, i.e., by the rapid cooling of the now molded protection element in the hot molding tool. The resulting structure is influenced by the quenching speed and is able to be adjusted accordingly by the person skilled in the art. This creates a martensitic high strength structure, which is beneficial for the protective effect of the protection element.

After quenching, an immediate tempering step is advantageous, when using individual steel profiles. In this process, the brittle tetragon, a martensite with precipitation of fine carbides, which is created during the hardening of a steel, is converted into the cubic martensite structure. This has a smaller volume and ensures a relaxation of the grain lattice of the crystal and eliminates the so-called glass hardness of the material. In this respect, this step enables effective protection elements to be produced with correspondingly good protection against ballistic shot impacts.

After hardening the protection element, laser cutting of the protection element is able to occur. The protection element is able to be given its final shape by means of laser cutting.

In at least one embodiment of the present disclosure, the individual profiles are welded to form a preform of the protection element by molding a weld seam on the side of the individual profiles facing the shot impact and a weld seam on the side of the individual profiles facing away from the shot impact. The terms "side facing the shot impact" and "side facing away from the shot impact" refer to the respective side of the protection element in its intended place of use. The formation of two weld seams ensures a secure and robust connection between the individual profiles.

When welding on the side of the individual profiles facing the shot impact, a welding filler material that has a higher hardness is able to be used rather than a welding filler material that is used when welding the weld seam on the side of the individual profiles facing away from the shot impact. This measure further increases the shot impact resistance and thus the protective effect of the protection element, in the region of the weld seams.

In at least one embodiment of the present disclosure, an austenitic filler material is used during welding and formation of the weld seams. These austenitic filler materials ensure that the stresses during welding are compensated. Although such filler materials are not bulletproof in themselves, the hardening according to the present disclosure and the avoidance of bending radii maximize the protective effect in the region of the weld seams.

In at least one embodiment of the present disclosure, after the welding of the individual profiles and/or after the hardening of the protection element in the region of the weld seam, at least one reinforcement element is joined, or welded, to the welded individual profiles. The reinforcement element, also called overlap, protects the concealed weld seam and strengthens the connection between the individual profiles. This increases the protective effect of the protection element. The reinforcement element is a profile with a rectangular cross-section, which is joined at each end to one of the welded individual profiles.

The reinforcement element has the same hardness as the individual profiles and is made of protective steel. In at least one embodiment of the present disclosure, the reinforcement element has a smaller wall thickness than the individual profiles. The wall thickness of the reinforcement element is between 2 mm and 5 mm.

The reinforcement element is joined to the respective individual profile at an angle of 10° to 40°. The larger the angle between the joined individual profiles, the smaller the angle between the reinforcement element and the respective individual profile.

The reinforcement element is able to be welded to the individual profiles on the side facing away from the shot or on the side facing the shot.

After welding the individual profiles and/or hardening the protection element, a deposition weld seam is able to be formed on the weld seam. The deposition weld strengthens the weld seam that is formed when the individual profiles are welded together to form a zigzag-shaped preform of the protection element. This increases the protective effect of the protection element. A combination of deposition weld seam and reinforcement element is also possible.

When welding the deposition weld seam, a welding filler material that has a higher hardness is able to be used rather than a welding filler material that is used when welding the weld seam.

In at least one embodiment of the present disclosure, the protection element is subjected to a final calibration after the reinforcement element has been joined and/or after the deposition weld seam has been formed. This is a second hot molding, which leads to hardening of the weld seams and/or the inserted reinforcement elements. This further increases the bullet resistance and thus the protective effect of the protection element according to the present disclosure.

In at least one embodiment of the present disclosure, the individual profiles are welded together such as to form a protrusion. One of the individual profiles to be welded thus protrudes slightly over the other individual profile. When the preform is formed into the zigzag-shaped protection element in the hot molding tool, the protrusion is bent in such a way that the weld seam is covered by the protrusion. The bent protrusion thus acts as an additional protective layer and protects the weld seam from an impacting projectile and increases the stability of the protection element. In this way, the protective effect of the protection element is able to be further increased.

In at least one embodiment of the present disclosure, the individual profiles are welded to each other at an angle of 45° to 110°, 60° to 100°, or 80° to 90°. In at least one embodiment of the present disclosure, this has proven to be advantageous for the resistance of the protection element to shots as well as for its stability.

Individual profiles made of sheet metal steel, rolled steel or hardened steel are able to be used.

In at least one embodiment of the present disclosure, individual profiles with a hardness of 500 to 700 Brinell are used.

In at least one embodiment of the present disclosure, individual profiles with a wall thickness of 3 mm to 10 mm, or 5 mm to 8 mm, are used. These wall thicknesses have proven to be a compromise between shot impact resistance and the weight of the protection element.

The protection element is able to be coated with a protective layer in a final process step. This is advantageous, for example, when the protection element is used on the outer wall of a vehicle.

The invention further includes a zigzag-shaped protection element, which is produced according to the aforementioned production method. The protection element is formed from multiple individual profiles and the individual profiles are welded to one another in a zigzag shape at an angle of 30° to 120°, at an angle of 45° to 110°, from 60° to 100°, or from 80° to 90°. The protection element according to the present disclosure is hot molded and mold hardened. The zigzag-shaped protection element thus maintains the necessary protective effect over its entire extension, without weakening in certain regions during production and thus without suffering a loss in terms of protective capacity.

In at least one embodiment of the present disclosure, the individual profiles are welded to form a weld seam on a side of the individual profiles facing the shot impact and a weld seam on the side of the individual profiles facing away from the shot impact.

In at least one embodiment of the present disclosure, the weld seam on the side of the individual profiles facing the shot impact has a welding filler which has a higher hardness than a welding filler of the weld seam on the side of the individual profiles facing away from the shot impact.

In the region of the weld seam, at least one reinforcement element is joined, or welded, to the welded individual profiles. The reinforcement element, also called overlap, protects the concealed weld seam and strengthens the connection between the individual profiles. This increases the protective effect of the protection element. The reinforcement element is a profile with a rectangular cross-section, which is joined at each end to one of the welded individual profiles.

The reinforcement element has the same hardness as the individual profiles. In at least one embodiment of the present disclosure, the reinforcement element has a smaller wall thickness than the individual profiles. The wall thickness of the reinforcement element is between 2 mm and 5 mm.

The reinforcement element is joined to the respective individual profile at an angle of 10° to 40°. The larger the angle between the joined individual profiles, the smaller the angle between the reinforcement element and the respective individual profile.

The reinforcement element is able to be welded to the individual profiles on the side facing away from the shot or on the side facing the shot.

In at least one embodiment of the present disclosure, a deposition weld seam is formed on the weld seam. The weld seam is strengthened by the deposition weld seam. This increases the protective effect of the protection element. A combination of deposition weld seam and reinforcement element is also possible.

The deposition weld seam has a welding filler material that has a higher hardness than a welding filler material of the weld seam.

In at least one embodiment of the present disclosure, the individual profiles are able to be welded to form a protrusion, wherein the protrusion is bent over in such a way that the weld seam is covered by the protrusion.

The individual profiles are formed from steel sheet metal, from rolled steel sheet metal, or from hardened steel sheet metals.

The individual profiles have a hardness of 500 to 700 Brinell.

In at least one embodiment of the present disclosure, the individual profiles have a wall thickness of 3 to 10 mm, or 5 to 8 mm.

BRIEF DESCRIPTION OF THE DRAWINGS

Further objects, advantages, features and possible uses of the present disclosure will be apparent from the following description. Various embodiments are shown in the schematic figures. In the figures.

DETAILED DESCRIPTION

Figures 1A, 1B, 1C:
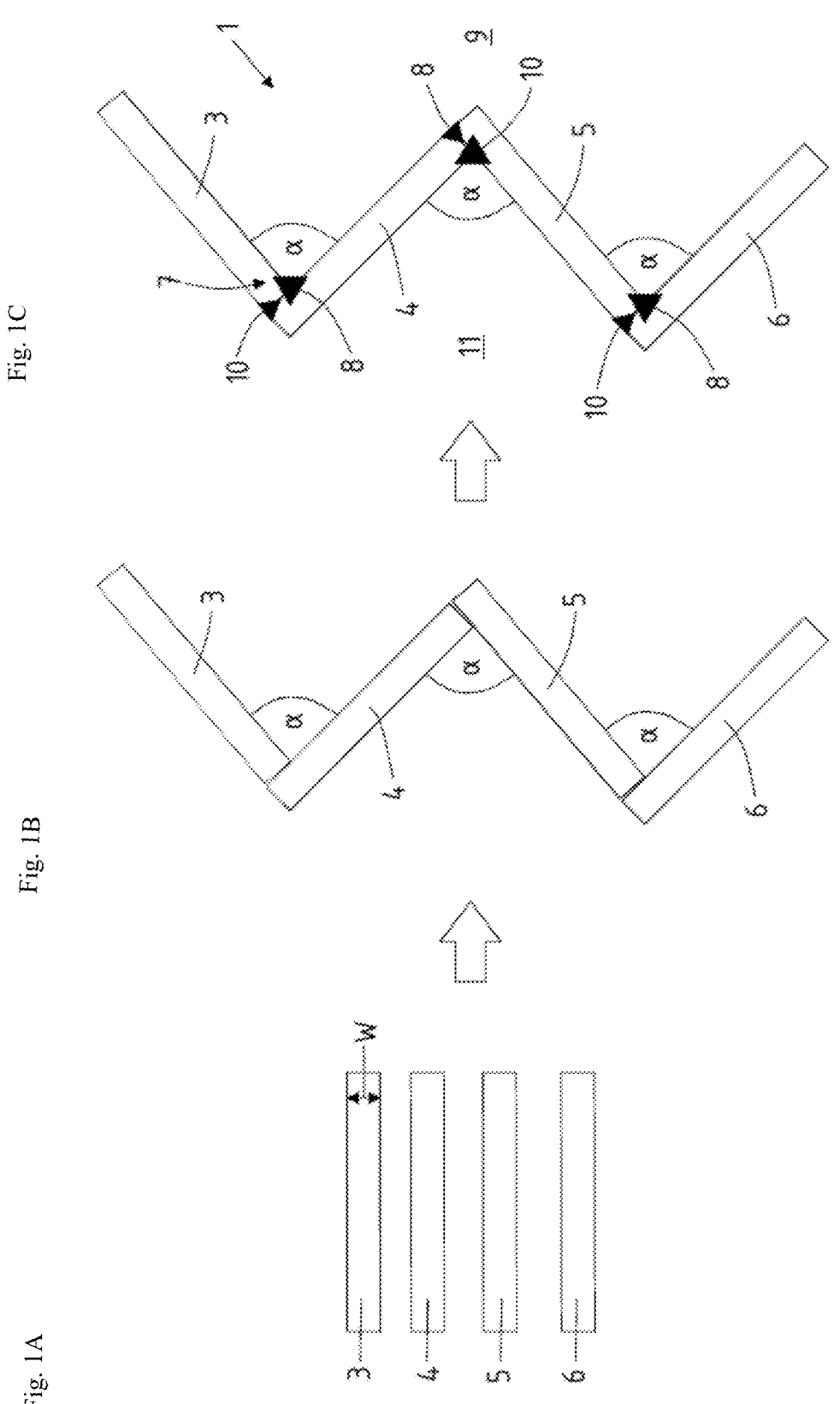
FIG. 1A-FIG. 1C show a method according to at least one embodiment for producing a preform of a zigzag-shaped protection element.

In the figures, the same reference numerals are used for same or similar components, even if a repeated description is omitted for reasons of simplicity.

FIG. 1A-FIG. 1C show the production of a preform 1 of a zigzag-shaped protection element 2 in a plan view.

As shown in FIG. 1A, in order to produce the preform 1, individual profiles 3, 4, 5 and 6 are first provided. Individual profiles 3, 4, 5, 6 made of steel sheet metal with a wall thickness W of 3 mm to 10 mm are used.

The individual profiles 3, 4, 5 and 6 are arranged in a zigzag pattern, see FIG. 1B. The respective adjacent individual profiles 3 and 4, 4 and 5, as well as 5 and 6 each have an angle α of 30° to 120° to each other.

As shown in FIG. 1C, the adjacent individual profiles 3 and 4, 4 and 5, and 5 and 6 are welded together in the region of respective end portions 7 to form a weld seam 8 on a side 9 of the individual profiles 3, 4, 5 and 6 facing away from the shot impact and a weld seam 10 on a side 11 facing the shot impact. The respective adjacent individual profiles 3 and 4, 4 and 5, as well as 5 and 6 are welded at an angle α of 30° to 120° to each other. The side 11 facing the shot impact and the side 9 facing away from the shot impact refer to the corresponding sides of the zigzag-shaped protection element 2 in relation to the later place of use.

After welding the individual profiles 3, 4, 5 and 6, the preform 1 of the protection element 2 is placed in a hot molding tool not shown in detail and heated to the austenitization temperature of the steel. Subsequently, a molding process, for example, a final molding or final calibration of the preform 1 to form the zigzag-shaped protection element 2 takes place. After the molding process, the protection element 2 is hardened, for example, press hardened. The protection element 2 is then able to be tempered and final corrections are able to be made by means of laser cutting.

The production method according to the present disclosure has the advantage that no bending molding is required, which would lead to a weakening of the zigzag-shaped protection element 2.

Figure 2:
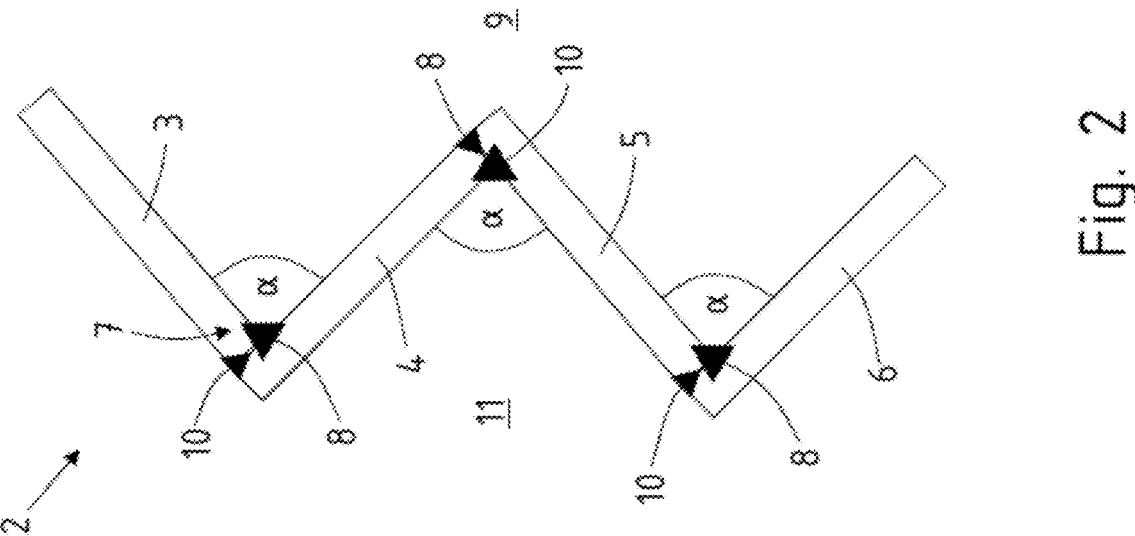
FIG. 2 shows a zigzag-shaped protection element according to at least one embodiment in a plan view.

FIG. 2 shows a correspondingly manufactured zigzag-shaped protection element 2 in a plan view.

When welding the weld seams 10 on the side 11 of the individual profiles 3, 4, 5 and 6 facing the shot impact, a welding filler material is used which has a higher hardness than a welding filler material used when welding the weld seams 8 on the side 9 of the individual profiles 3, 4, 5 and 6 facing the shot impact.

Individual profiles 3, 4, 5 and 6 with a hardness of 500 to 700 Brinell are used.

Figure 3:
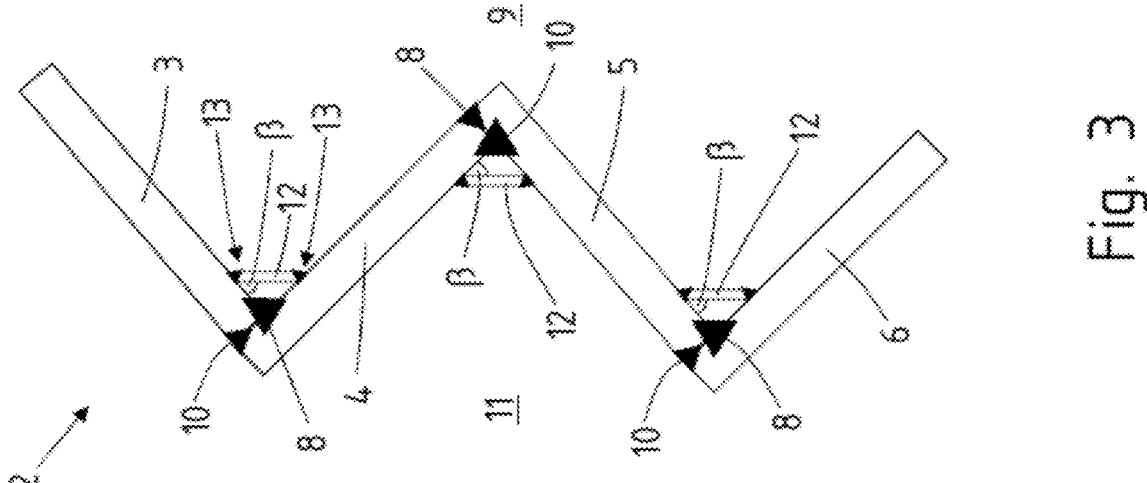
FIG. 3 shows a zigzag-shaped protection element according to at least one embodiment in a plan view.

After welding the individual profiles 3, 4, 5 and 6 and/or after hardening the zigzag-shaped protection element 2, a respective reinforcement element 12 is able to be welded to the welded individual profiles 3 and 4, 4 and 5, and 5 and 6 in the region of the weld seams 8, 10. The reinforcement elements 12 protect and reinforce the underlying weld seams 8, 10. In addition, the binding between the individual profiles is improved, thus increasing the protective effect of the protection element 2. A correspondingly produced protection element 2 is shown in FIG. 3.

The reinforcement elements 12 are rectangular in cross-section and are welded the respective end regions 13 to the corresponding individual profiles 3, 4, 5 and 6. An angle β between 10° and 40° is formed between the reinforcement elements 12 and the respective individual profiles 3, 4, 5 and 6. The larger the angle α between the welded individual profiles 3 and 4, 4 and 5, and 5 and 6, the smaller the angle β between the reinforcement elements 12 and the respective individual profiles 3, 4, 5 and 6.

The reinforcement elements 12 have the same hardness as the individual profiles 3, 4, 5 and 6. The material thickness of the reinforcement elements 12 is between 2 mm and 5 mm.

Figure 4:
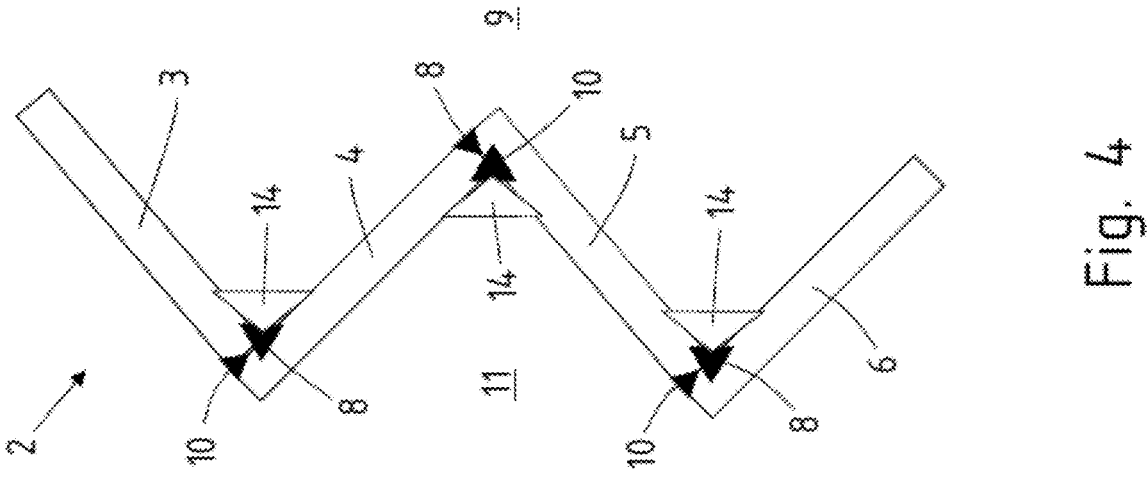
FIG. 4 shows a zigzag-shaped protection element according to at least one embodiment in a plan view.

In addition or as an alternative to the reinforcement elements 12, after welding the individual profiles 3, 4, 5 and 6 and/or after hardening the protection element 2, a deposition weld seam 14 is able to be formed on the weld seams 8, 10 by means of deposition welding. The weld seam 8, 10 underneath is additionally reinforced by the deposition weld seam 14, which increases the protective effect of the protection element 2. A correspondingly produced protection element 2 is shown in FIG. 4.

When deposition welding the deposition weld seam 14, a welding filler material is used that has a higher hardness than a welding filler material that is used when welding the weld seams 8, 10. This also has a beneficial effect on the protective effect of the protection element 2.

The protection element 2 is subjected to a final calibration after the welding of the reinforcement elements 12 and/or after the formation of the deposition weld seams 14. This ensures that the protection element 2 exactly complies with production specifications.

Figures 5A, 5B, 5C:
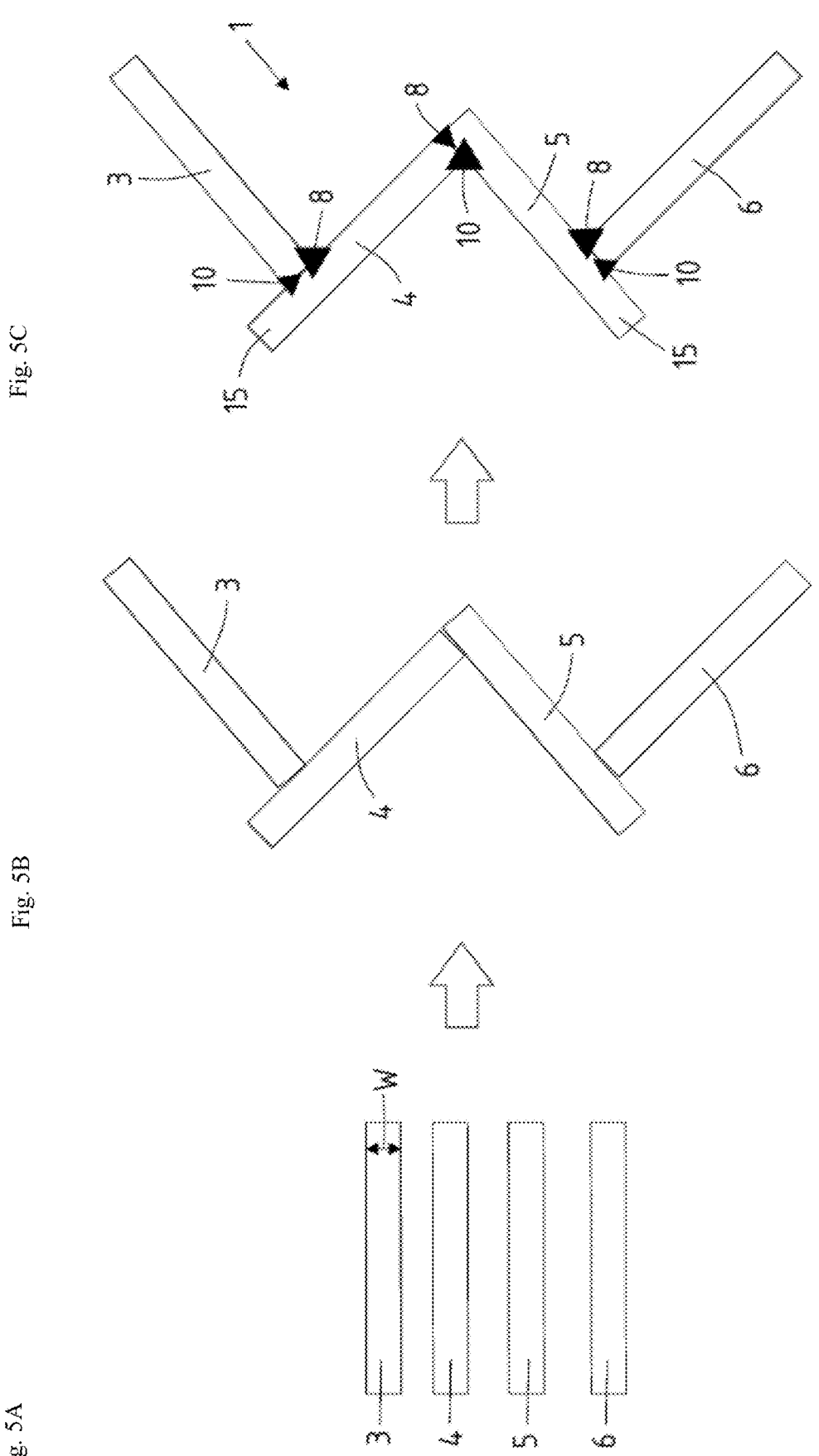
FIG. 5A-FIG. 5C show another method according to at least one embodiment for producing a zigzag-shaped protection element.
Figure 6:
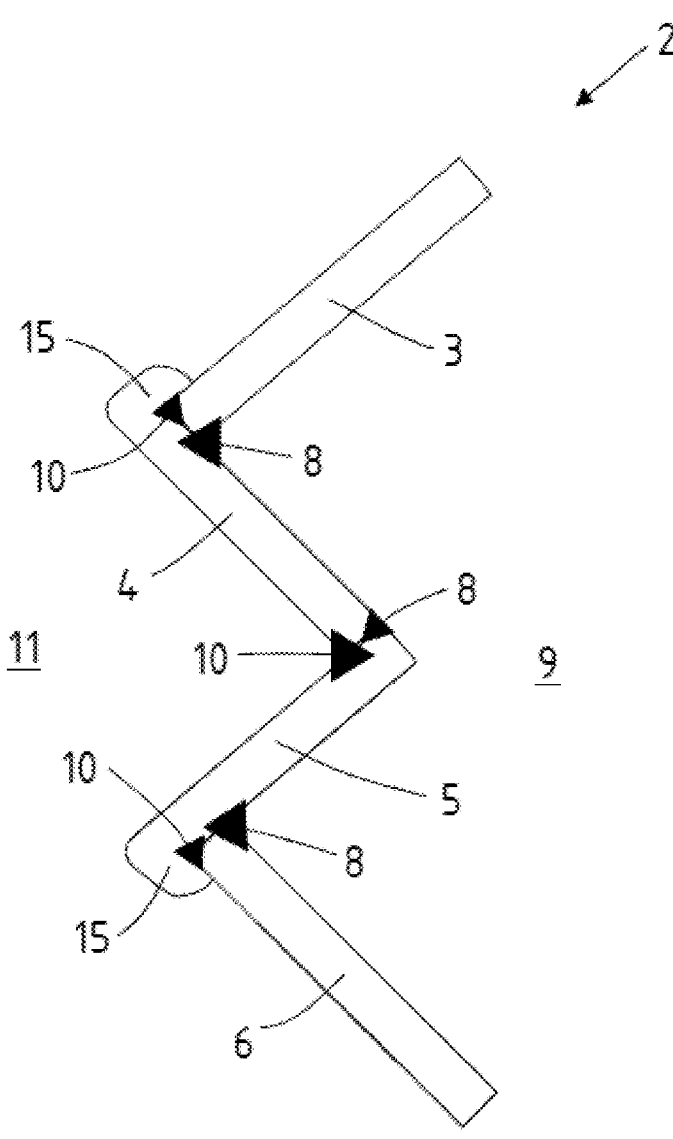
FIG. 6 shows a zigzag-shaped protection element according to at least one embodiment in a plan view.

FIG. 5A-FIG. 5C show a further manufacturing method according to the present disclosure of a preform 1 of the zigzag-shaped protection element 2. Here, the individual profiles 3 and 4, as well as 5 and 6, are welded together to form a protrusion 15. During the subsequent molding of the preform 1 into the zigzag-shaped protection element 2 in the hot molding tool, the protrusion 15 is bent in such a way that the weld seams 10 are covered by the protrusion 13. The resulting zigzag-shaped protection element 2 is shown in FIG. 6. The protrusion 15 is located on the side 11 of the zigzag-shaped protection element 2 facing the shot impact, so that the concealed weld seams 10 are protected. The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A method of producing a zigzag-shaped protection element, the method comprising:
   welding a plurality of individual profiles to form a zigzag-shaped preform of the zigzag-shaped protection element so as to form at least one weld seam between each pair of adjacent individual profiles among the plurality of individual profiles, wherein the adjacent individual profiles are welded to each another at an angle of 30° to 120°,
   inserting the zigzag-shaped preform into a hot molding tool,
   molding the zigzag-shaped preform into the zigzag-shaped protection element in the hot molding tool, and
   mold hardening of the zigzag-shaped protection element in the hot molding tool.

2. The method according to claim 1, further comprising:
   after the mold hardening of the zigzag-shaped protection element, laser cutting the zigzag-shaped protection element.

3. The method according to claim 1, wherein the at least one weld seam comprises:
   a first weld seam on a first side of the adjacent individual profiles facing a shot impact, and
   a second weld seam on a second side of the adjacent individual profiles facing away from the shot impact.

4. The method according to claim 3, wherein a welding filler material used during the welding of the first weld seam on the first side facing the shot impact has a higher hardness than a welding filler material used during the welding of the second weld seam on the second side facing away from the shot impact.

5. The method according to claim 1, further comprising:
   after at least one of the welding or the mold hardening, in a region of the at least one weld seam, joining at least one reinforcement element to the welded adjacent individual profiles.

6. The method according to claim 1, further comprising:
   after at least one of the welding or the mold hardening, forming, by deposition welding, a deposition weld seam on the at least one weld seam.

7. The method according to claim 6, wherein a welding filler material used during the deposition welding of the deposition weld seam has a higher hardness than a welding filler material used during the welding of the at least one weld seam.

8. The method according to claim 6, further comprising:
   a final calibration of the zigzag-shaped protection element after the forming of the deposition weld seam.

9. The method according to claim 1, wherein
   in the welding, the adjacent individual profiles are welded such that one of the adjacent individual profiles comprises a protrusion, and
   the protrusion is bent during the molding of the zigzag-shaped preform into the zigzag-shaped protection element in the hot molding tool, such that the at least weld seam is covered by the bent protrusion.

10. The method according to claim 1, wherein the adjacent individual profiles are welded to one another at an angle of 45° to 110°.

11. The method according to claim 1, wherein the plurality of individual profiles comprise steel sheet metal.

12. The method according to claim 1, wherein each of the plurality of individual profiles comprises a hardness of 500 to 700 Brinell.

13. The method according to claim 1, wherein each of the plurality of individual profiles comprises a wall thickness of 3 to 10 mm.

14. A zigzag-shaped protection element, comprising:
   a plurality of individual profiles welded in a zigzag shape with at least one weld seam between each pair of adjacent individual profiles among the plurality of individual profiles, wherein the adjacent individual profiles are welded to one another at an angle of 30° to 120°, and the zigzag-shaped protection element is hot molded and mold hardened.

15. The zigzag-shaped protection element according to claim 14, wherein the at least one weld seam comprises:
   a first weld seam on a first side of the adjacent individual profiles facing a shot impact, and
   a second weld seam on a second side of the adjacent individual profiles facing away from the shot impact.

16. The zigzag-shaped protection element according to claim 15, wherein the first weld seam on the first side facing the shot impact has a welding filler material which has a higher hardness than a welding filler material of the second weld seam on the second side facing away from the shot impact.

17. The zigzag-shaped protection element according to claim 14, further comprising:
   in a region of the at least one weld seam, at least one reinforcement element joined to the welded adjacent individual profiles.

18. The zigzag-shaped protection element according to claim 14, further comprising:

a deposition weld seam formed on the at least one weld seam.

19. The zigzag-shaped protection element according to claim 18, wherein the deposition weld seam has a welding filler material which has a higher hardness than a welding filler material of the at least one weld seam.

20. The zigzag-shaped protection element according to claim 14, wherein one of the adjacent individual profiles comprises a protrusion, which is bent over to cover the at least one weld seam.

21. The zigzag-shaped protection element according to claim 14, wherein the adjacent individual profiles are welded to one another at an angle of 45° to 110°.

\* \* \* \* \*